(12) United States Patent  (10) Patent No.: US 8,506,092 B2
Sato et al.  (45) Date of Patent: Aug. 13, 2013

(54) PROJECTOR

(75) Inventors: Shun Sato, Shiojiri (JP); Tetsuo Terashima, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 213 days.

(21) Appl. No.: 13/209,036

(22) Filed: Aug. 12, 2011

(65) Prior Publication Data

US 2012/0044466 A1    Feb. 23, 2012

(30) Foreign Application Priority Data

Aug. 19, 2010  (JP) ................................. 2010-183711

(51) Int. Cl.
    *G03B 21/20* (2006.01)
(52) U.S. Cl.
    USPC ............................................................ 353/85
(58) Field of Classification Search
    USPC .................. 353/7, 85; 315/209 R, 216, 219, 315/224, 246, 247, 291, 307, 308
    See application file for complete search history.

(56) References Cited

U.S. PATENT DOCUMENTS

2010/0165305 A1* 7/2010 Takezawa ...................... 353/85

FOREIGN PATENT DOCUMENTS

JP   A-2003-102030   4/2003
JP   A-2009-237302   10/2009

* cited by examiner

*Primary Examiner* — Thanh Luu
*Assistant Examiner* — Renee Naphas
(74) *Attorney, Agent, or Firm* — Oliff & Berridge, PLC

(57) ABSTRACT

A projector includes a discharge lamp, a discharge lamp driver that supplies the discharge lamp with a current, a voltage detector that detects a drive voltage for driving the discharge lamp, and a controller that controls the discharge lamp driver. The controller carries out a first control process in which the discharge lamp driver is so controlled that an absolute magnitude of the drive current in a first period is smaller than that in a second period and that an AC current is supplied to the discharge lamp in a second period. The first control process includes a first electric power control process in which first average drive electric power is determined based on the voltage detected by the voltage detector and a current is supplied to the discharge lamp in such a way that average drive electric power is set at the first average drive electric power.

5 Claims, 10 Drawing Sheets first polarity state p1 second polarity state p2

PROJECTOR

BACKGROUND

1. Technical Field

The present invention relates to a projector.

2. Related Art

Projectors using a high-pressure mercury lamp, a metal halide lamp, or any other suitable discharge lamp have been in practical use. For example, JP-A-2003-102030 discloses a projector having a mechanism for changing the intensity of the light from a light source in accordance with the color selected by a color separation system or any other suitable mechanism and in synchronization with a video signal. JP-A-2009-237302, however, describes that simply changing the intensity of the light from a light source disadvantageously accelerates wear of the electrodes of a discharge lamp.

Further, projectors using a high-pressure mercury lamp, a metal halide lamp, or any other suitable discharge lamp to output stereoscopic video images have recently been brought into practical use.

To output stereoscopic video images, for example, video images for the right and left eyes are switched therebetween and alternately outputted (for example, a method called "XPAND beyond cinema (trademark of X6D Limited)" and other methods based on active shutter eyeglasses). In this method, active shutter eyeglasses or any other device synchronized with a video signal allows a wearer to view right-eye video images with the right eye and left-eye video images with the left eye, whereby the wearer can view the video images stereoscopically with the aid of parallax between the right and left eyes.

When stereoscopic video images are projected by using a method for alternately outputting right-eye video images and left-eye video images, the amount of light incident on the right and left eyes becomes halved or even smaller than a case where planar video images (two-dimensional video images) are projected in related art. Further, if the right-eye video images enters the left eye and the left-eye video images enters the right eye, or crosstalk occurs, the viewer will not view the video images with a sense of three-dimensionality any more. In this case, it is necessary to provide a period during which both the active shutters are closed. As a result, when stereoscopic video images are projected by using a method for alternately outputting right-eye video images and left-eye video images, the video images disadvantageously appear darker than a case where planar video images are projected in related art. To make the video images appear brighter, it is conceivable to simply increase drive electric power. In this case, however, power consumption of the projector disadvantageously increases, and the increase in drive electric power accelerates degradation of peripheral parts and causes other problems.

SUMMARY

An advantage of some aspects of the invention is to provide a projector capable of making projected stereoscopic video images appear bright while reducing the amount of wear of electrodes of a discharge lamp.

An aspect of the invention is directed to a projector that switches video images between right-eye and left-eye video images at predetermined switching timings and alternately outputs the right-eye and left-eye video images, the projector including a discharge lamp, a discharge lamp driver that supplies the discharge lamp with a drive current for driving the discharge lamp, a voltage detector that detects a drive voltage for driving the discharge lamp, and a controller that controls the discharge lamp driver. A period sandwiched between temporally adjacent ones of the switching timings starts with a first period and ends with a second period. The controller carries out a first control process in which the discharge lamp driver is so controlled not only that an absolute magnitude of the drive current is relatively small in each of the first periods and relatively large in each of the second periods but also that an AC current is supplied as the drive current to the discharge lamp in each of the second periods. The first control process includes a first electric power control process in which first average drive electric power is determined based on the drive voltage detected by the voltage detector and the discharge lamp driver is controlled to supply the drive current to the discharge lamp in such a way that average drive electric power is set at the first average drive electric power.

The average drive electric power in the first electric power control process is the average of the drive electric power for driving the discharge lamp in the periods during which the first control process is carried out by using the same first average drive electric power.

According to the above aspect of the invention, since the controller controls the discharge lamp driver in such a way that the absolute magnitude of the drive current is relatively small in each of the first periods and relatively large in each of the second periods, the projector can make projected stereoscopic video images appear bright.

Further, according to the above aspect of the invention, since the controller controls the discharge lamp driver to supply an AC current as the drive current to the discharge lamp in each of the second periods, the amount of wear of electrodes of the discharge lamp can be reduced.

Moreover, according to the above aspect of the invention, since the controller carries out the first electric power control process, in which the first average drive electric power is determined based on the drive voltage detected by the voltage detector and the discharge lamp driver is controlled to supply the drive current to the discharge lamp in such a way that the average drive electric power is set at the first average drive electric power, the discharge lamp can be driven in accordance with the state of wear of the electrodes of the discharge lamp. The amount of wear of the electrodes of the discharge lamp can therefore be further reduced.

The projector may further includes a video image information judging unit that judges whether or not video image information to be projected is stereoscopic video image information based on which right-eye video images and left-eye video images are switched and alternately outputted at the switching timings, and the controller may carry out the first control process when the judgment made by the video image information judging unit shows that the video image information is the stereoscopic video image information.

In this way, when stereoscopic video image information, which causes a large amount of wear of the electrodes of the discharge lamp, is projected, the amount of wear of the electrodes of the discharge lamp can be reduced.

In the projector, when the judgment made by the video image information judging unit shows that the video image information is not the stereoscopic video image information, the controller may carry out a second control process in which the discharge lamp driver is controlled to supply an AC current as the drive current to the discharge lamp. The second control process may include a second electric power control process in which second average drive electric power is determined based on the drive voltage detected by the voltage detector and the discharge lamp driver is controlled to supply the drive current to the discharge lamp in such a way that the average drive electric power is set at the second average drive electric power. The first average drive electric power and the second average drive electric power may be determined by using different references in the first electric power control process and the second electric power control process.

The average drive electric power in the second electric power control process is the average of the drive electric power for driving the discharge lamp in the periods during which the second control process is carried out by using the same second average drive electric power.

In this way, the discharge lamp can be driven by using appropriate drive electric power when stereoscopic video image information, which causes a large amount of wear of the electrodes of the discharge lamp, is projected, whereas the discharge lamp can be driven by using another appropriate drive electric power when another type of information is projected.

In the projector, the controller may determine the first average drive electric power and the second average drive electric power in such a way that the first average drive electric power is higher than or equal to the second average drive electric power.

In this way, when stereoscopic video image information, which causes a large amount of wear of the electrodes of the discharge lamp, is particularly projected, the amount of wear of the electrodes of the discharge lamp can be reduced.

In the projector, when the drive voltage detected by the voltage detector has a large value, at least one of the first average drive electric power and the second average drive electric power may have a large value.

In this way, the amount of wear of the electrodes of the discharge lamp can be reduced in accordance with the state of wear of the electrodes of the discharge lamp. Further, decrease in brightness of the discharge lamp can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

A preferred embodiment of the invention will be described below in detail with reference to the drawings. The embodiment described below is not intended to inappropriately limit the contents of the invention set forth in the claims. Further, all the components described below are not necessarily essential in the invention.

1. Projector According to Present Embodiment 1-1. Optical System of Projector

Figure 1:
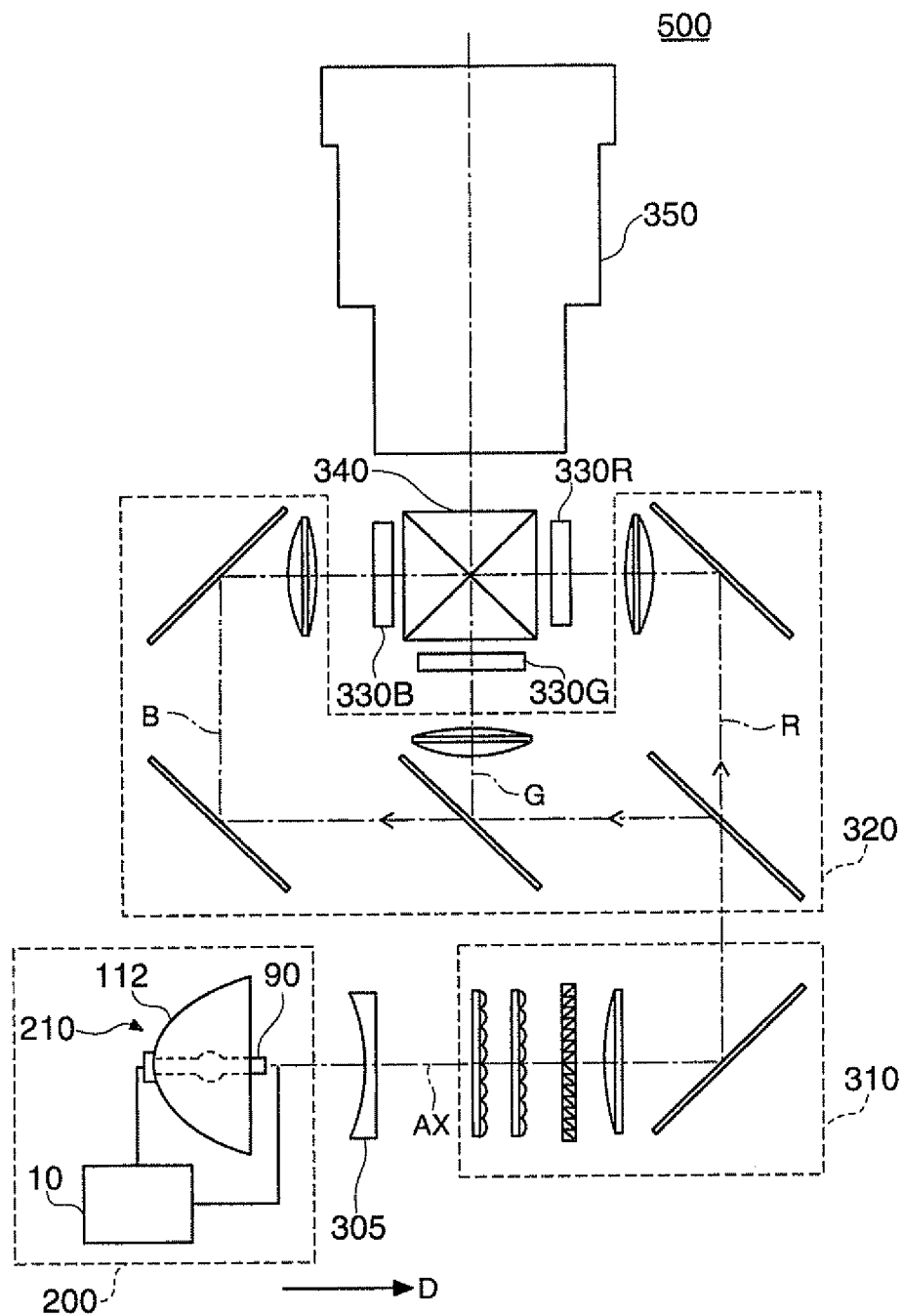
FIG. 1 describes an optical system of a projector according to an embodiment.

FIG. 1 describes an optical system of a projector 500 according to the present embodiment. The projector 500 includes a light source apparatus 200, a parallelizing lens 305, an illumination system 310, a color separation system 320, three liquid crystal light valves 330R, 330G, and 330B, a cross dichroic prism 340, and a projection system 350.

The light source apparatus 200 includes a light source unit 210 and a discharge lamp activating apparatus 10. The light source unit 210 includes a primary reflector 112, a secondary reflector 50 (which will be described later), and a discharge lamp 90. The discharge lamp activating apparatus 10 supplies electric power to the discharge lamp 90 to turn on the discharge lamp 90. The primary reflector 112 reflects light emitted from the discharge lamp 90 in an irradiation direction D. The irradiation direction D is parallel to an optical axis AX. The light from the light source unit 210 passes through the parallelizing lens 305 and enters the illumination system 310. The parallelizing lens 305 parallelizes the light from the light source unit 210.

The illumination system 310, through which the light from the light source apparatus 200 passes, homogenizes the illuminance of the light in the liquid crystal light valves 330R, 330G, and 330B. The illumination system 310 further aligns polarization directions of the light fluxes that form the light from the light source apparatus 200. The reason for this is to effectively use the light from the light source apparatus 200 in the liquid crystal light valves 330R, 330G, and 330B. The light having its illuminance distribution and polarization direction adjusted enters the color separation system 320. The color separation system 320 separates the light incident thereon into red (R), green (G), and blue (B) three color light fluxes. The three color light fluxes are modulated by the liquid crystal light valves 330R, 330G, and 330B, which correspond to the respective RGB colors. The liquid crystal light valves 330R, 330G, and 330B include liquid crystal panels 560R, 560G, and 560B (which will be described later) and polarizers (not shown) disposed on the light-incident side and the light-exiting side of the liquid crystal panels 560R, 560G, and 560B. The modulated three color light fluxes are combined by the cross dichroic prism 340. The combined light is then incident on the projection system 350. The projection system 350 projects the incident light on a screen (not shown). An image is thus displayed on the screen.

The parallelizing lens 305, the illumination system 310, the color separation system 320, the cross dichroic prism 340, and the projection system 350 can be configured in a variety of known ways.

Figure 2:
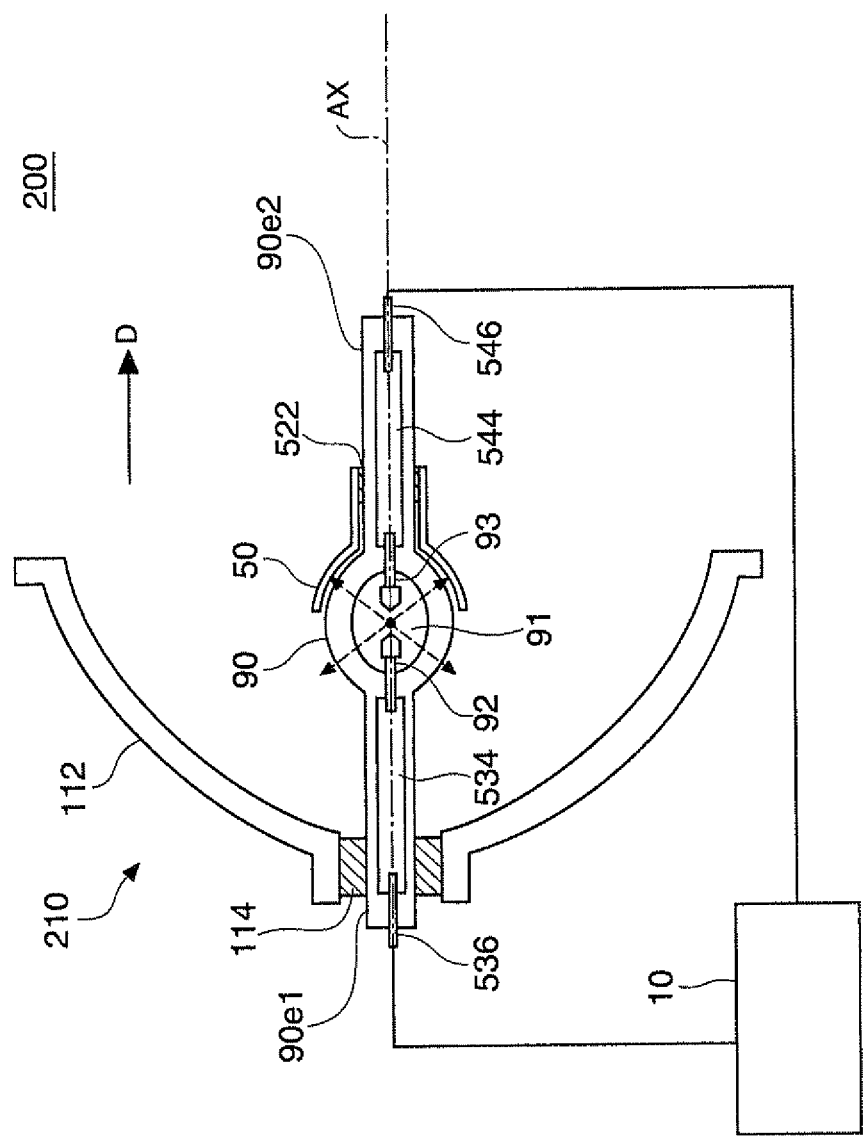
FIG. 2 describes the configuration of a light source apparatus.

FIG. 2 describes the configuration of the light source apparatus 200. The light source apparatus 200 includes the light source unit 210 and the discharge lamp activating apparatus 10. FIG. 2 shows a cross section of the light source unit 210. The light source unit 210 includes the primary reflector 112, the discharge lamp 90, and the secondary reflector 50.

The discharge lamp 90 has a rod-like shape extending from a first end 90e1 to a second end 90e2 along the irradiation direction D. The discharge lamp 90 is made of quartz glass or any other suitable light-transmissive material. A central portion of the discharge lamp 90 has a spherically swelled shape, and a discharge space 91 is formed in the central portion. The discharge space 91 has a gas sealed therein, and the gas works as a discharge medium containing a rare gas, a metal halide, and other substances.

In the discharge space 91, a first electrode 92 and a second electrode 93 protrude from side portions of the discharge lamp 90. In the discharge space 91, the first electrode 92 is disposed close to the first end 90e1 and the second electrode 93 is disposed close to the second end 90e2. Each of the first electrode 92 and the second electrode 93 has a rod-like shape extending along the optical axis AX. In the discharge space 91, electrode front portions (also called "discharge ends") of the first electrode 92 and the second electrode 93 face each other with a predetermined distance therebetween. The first electrode 92 and the second electrode 93 are made of tungsten or any other suitable metal.

The first end 90e1 of the discharge lamp 90 has a first terminal 536 provided therein. The first terminal 536 is electrically connected to the first electrode 92 with a conductive member 534 extending along the inner space of the discharge lamp 90. The second end 90e2 of the discharge lamp 90 similarly has a second terminal 546 provided therein. The second terminal 546 is electrically connected to the second electrode 93 with a conductive member 544 extending along the inner space of the discharge lamp 90. The first terminal 536 and the second terminal 546 are made of tungsten or any other suitable metal. Each of the conductive members 534 and 544 is formed, for example, of a molybdenum foil.

The first terminal 536 and the second terminal 546 are connected to the discharge lamp activating apparatus 10. The discharge lamp activating apparatus 10 supplies a drive current for driving the discharge lamp 90 to the first terminal 536 and the second terminal 546. As a result, arc discharge is induced between the first electrode 92 and the second electrode 93. Light produced by the arc discharge (discharge light) is irradiated omnidirectionally from the discharge position, as indicated by the broken arrows.

The primary reflector 112 is fixed to the first end 90e1 of the discharge lamp 90 with a fixing member 114. The reflection surface of the primary reflector 112 (the surface facing the discharge lamp 90) has a spheroidal shape. The primary reflector 112 reflects the discharge light in the irradiation direction D. The reflection surface of the primary reflector 112 does not necessarily have a spheroidal shape but can have a variety of other shapes that reflect the discharge light in the irradiation direction D. For example, the reflection surface may have a paraboloidal shape. In this case, the primary reflector 112 can convert the discharge light into light substantially parallel to the optical axis AX, and the parallelizing lens 305 can therefore be omitted.

The secondary reflector 50 is fixed to the discharge lamp 90 with a fixing member 522 in a position close to the second end 90e2. The reflection surface of the secondary reflector 50 (the surface facing the discharge lamp 90) has a spherical shape surrounding the portion of the discharge space 91 that faces the second end 90e2. The secondary reflector 50 reflects the discharge light toward the primary reflector 112, whereby the efficiency representing how much the light irradiated from the discharge space 91 is used can be increased.

The fixing members 114, 522 can be made of an arbitrary heat-resistant material (inorganic adhesive, for example) that withstands heat generated by the discharge lamp 90. The primary reflector 112 and the secondary reflector 50 are not necessarily fixed to the discharge lamp 90, but the positional relationship among the primary reflector 112, the secondary reflector 50, and the discharge lamp 90 can be fixed in other arbitrary ways. For example, the discharge lamp 90 and the primary reflector 112 may be separately fixed to a housing (not shown) of the projector, and so may be the secondary reflector 50.

1-2. Circuit Configuration of Projector

Figure 3:
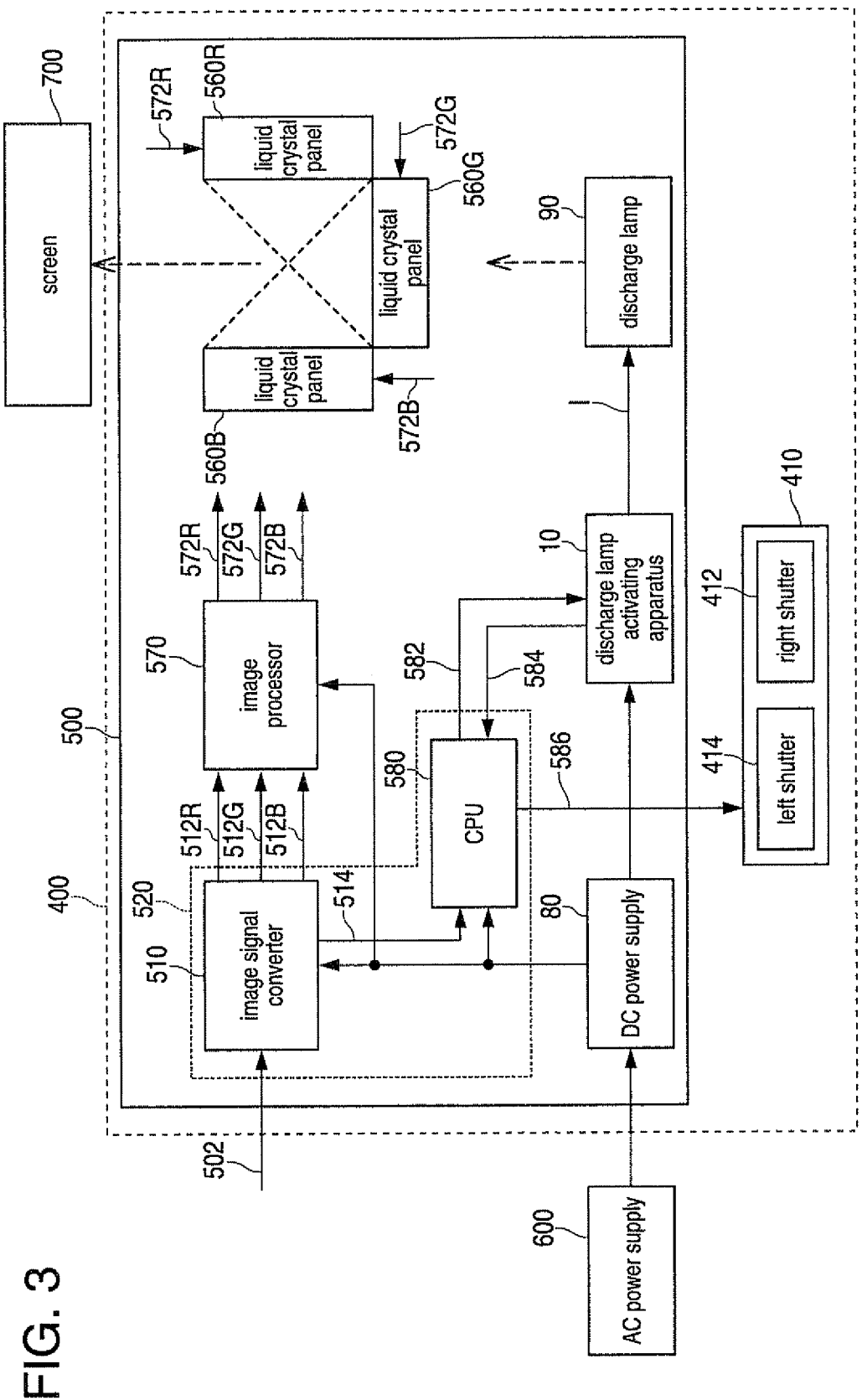
FIG. 3 shows an exemplary circuit configuration of the projector according to the present embodiment.

FIG. 3 shows an exemplary circuit configuration of the projector according to the present embodiment. The projector 500 may include a video image information judgment unit 520, a DC power supply 80, the discharge lamp activating apparatus 10, the discharge lamp 90, the liquid crystal panels 560R, 560G, and 560B, and an image processor 570 as well as the optical system described above. It is also possible to configure a projector system 400 including the projector 500 and active shutter eyeglasses 410.

The video image information judgment unit 520 judges whether or not video image information to be projected is stereoscopic video image information based on which right-eye video images and left-eye video images are switched and alternately outputted at predetermined switching timings (hereinafter sometimes simply referred to as "stereoscopic video image information"). The video image information judgment unit 520 may be formed of an image signal converter 510 and a CPU (central processing unit) 580.

The image signal converter 510 converts an externally inputted image signal 502 (such as a luminance-chrominance signal and an analog RGB signal) into a digital RGB signal having a predetermined word length to produce image signals 512R, 512G, and 512B and supplies them to the image processor 570. The image signal converter 510, when receiving an image signal 502 carrying stereoscopic video image information based on which right-eye video images and left-eye video images are alternately switched at predetermined switching timings, supplies a sync signal 514 to the CPU 580 based on the switching timings between the right-eye video images and the left-eye video images.

The CPU 580 judges based on the sync signal 514 whether or not the video image information to be projected is stereoscopic video image information based on which right-eye video images and left-eye video images are switched and alternately outputted at predetermined switching timings. The CPU 580 may control actions of the projector, starting from an activating action to a deactivating action. For example, the CPU 580 may output an activating instruction and a deactivating instruction to the discharge lamp activating apparatus 10 by using a communication signal 582. The CPU 580 may also receive activation information representing whether the discharge lamp 90 is turned on from the discharge lamp activating apparatus 10 by using a communication signal 584. The CPU 580 may further output a control signal 586 for controlling the active shutter eyeglasses 410 based on the sync signal 514 and in synchronization with the image signal 502 by using wired or wireless communication.

The image processor 570 performs image processing on the three image signals 512R, 512G, and 512B and supplies drive signals 572R, 572G, and 572B for driving the liquid crystal panels 560R, 560G, and 560B to the liquid crystal panels 560B, 560G, and 560B.

The DC power supply 80 converts an AC voltage supplied from an external AC power supply 600 into a constant DC voltage and supplies the DC voltage not only to the image signal converter 510 and the image processor 570, which are disposed on the secondary side of a transformer (accommodated in the DC power supply 80 but not shown), but also to the discharge lamp activating apparatus 10, which is disposed on the primary side of the transformer.

The discharge lamp activating apparatus 10 produces a high voltage between the electrodes of the discharge lamp 90 at the time of activation so that dielectric breakdown occurs and a discharge path is formed. Thereafter, the discharge lamp activating apparatus 10 supplies a drive current I for maintaining the discharge in the discharge lamp 90.

The liquid crystal panels 560R, 560G, and 560B modulate the luminance of the color light fluxes incident on the liquid crystal panels through the optical system described above based on the drive signals 572R, 572G, and 572B, respectively.

The active shutter eyeglasses 410 may include a right shutter 412 and a left shutter 414. The right shutter 412 and the left shutter 414 are opened and closed based on the control signal 586. When a user wears the active shutter eyeglasses 410, closing the right shutter 412 can block the right field of view. Similarly, when the user wears the active shutter eyeglasses 410, closing the left shutter 414 can block the left field of view. Each of the right shutter 412 and the left shutter 414 may, for example, be a liquid crystal shutter.

1-3. Configuration of Discharge Lamp Activating Apparatus

Figure 4:
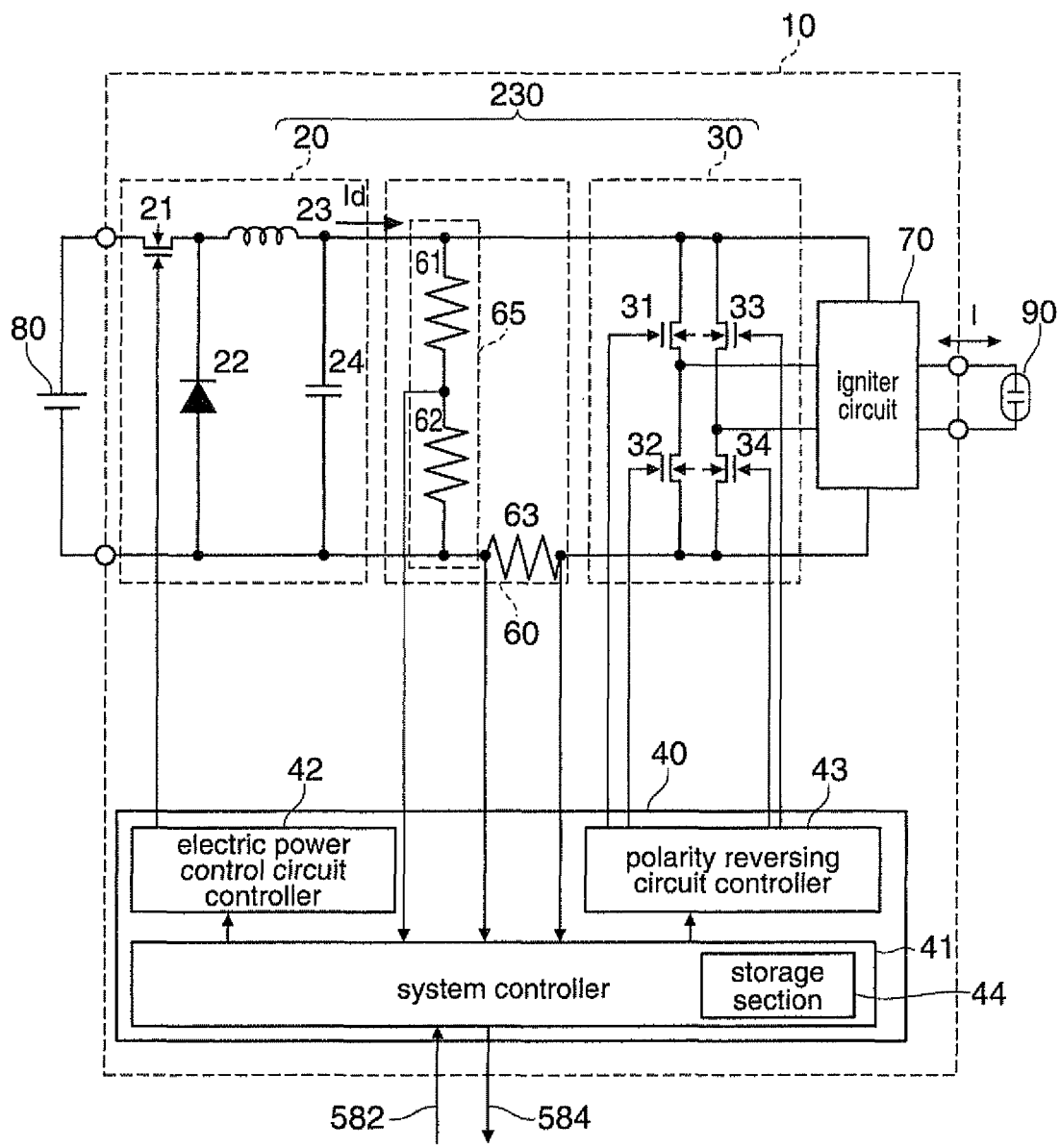
FIG. 4 shows an exemplary circuit configuration of a discharge lamp activating apparatus.

FIG. 4 shows an exemplary circuit configuration of the discharge lamp activating apparatus 10.

The discharge lamp activating apparatus 10 includes an electric power control circuit 20. The electric power control circuit 20 produces drive electric power to be supplied to the discharge lamp 90. In the present embodiment, the electric power control circuit 20 is configured as a step-down chopper circuit that receives an input from the DC power supply 80, steps down the input voltage, and outputs a DC current Id.

The electric power control circuit 20 can be formed of a switching device 21, a diode 22, a coil 23, and a capacitor 24. The switching device 21 can, for example, be a transistor. In the present embodiment, the switching device 21 has one end connected to a positive voltage side of the DC power supply 80 and the other end connected to a cathode terminal of the diode 22 and one end of the coil 23. The other end of the coil 23 is connected to one end of the capacitor 24, and the other end of the capacitor 24 is connected to an anode terminal of the diode 22 and a negative voltage side of the DC power supply 80. A control terminal of the switching device 21 receives a current control signal as an input from a controller 40 (which will be described later) so that the switching device 21 is turned on and off. The current control signal may, for example, be a PWM (pulse width modulation) control signal.

When the switching device 21 is turned on, a current flows through the coil 23 and energy is accumulated therein. When the switching device 21 is turned off, the energy accumulated in the coil 23 is discharged along a path passing through the capacitor 24 and the diode 22. The resultant DC current Id has a value according to the period during which the switching device 21 is open.

The discharge lamp activating apparatus 10 further includes a polarity reversing circuit 30. The polarity reversing circuit 30 receives the DC current Id outputted from the electric power control circuit 20 and reverses the polarity of the DC current Id at predetermined timings to produce and output the drive current I, which can be a DC current maintained for controlled duration or an AC current of an arbitrary frequency. In the present embodiment, the polarity reversing circuit 30 is formed of an inverter bridge circuit (full-bridge circuit).

The polarity reversing circuit 30, for example, includes a first switching device 31, a second switching device 32, a third switching device 33, and a fourth switching device 34, each of which is formed of a transistor or any other suitable device. The first switching device 31 and the second switching device 32 serially connected to each other are connected in parallel to the third switching device 33 and the fourth switching device 34 serially connected each other. Control terminals of the first switching device 31, the second switching device 32, the third switching device 33, and the fourth switching device 34 receive polarity reversing control signals from the controller 40, and the first switching device 31, the second switching device 32, the third switching device 33, and the fourth switching device 34 are turned on and off based on the polarity reversing control signals.

The polarity reversing circuit 30 alternately reverses the polarity of the DC current Id outputted from the electric power control circuit 20 to produce the drive current I, which can be a DC current maintained for controlled duration or an AC current of a controlled frequency, by repeatedly turning on and off the set of the first switching device 31 and the fourth switching device 34 and the set of the second switching device 32 and the third switching device 33 in an alternate manner, and outputs the drive current I from a common connection point to which the first switching device 31 and the second switching device 32 are connected and a common connection point to which the third switching device 33 and the fourth switching device 34 are connected.

That is, when the first switching device 31 and the fourth switching device 34 are turned on, the second switching device 32 and the third switching device 33 are turned off, whereas when the first switching device 31 and the fourth switching device 34 are turned off, the second switching device 32 and the third switching device 33 are turned on. In this configuration, when the first switching device 31 and the fourth switching device 34 are turned on, the drive current I is so produced that it flows from one end of the capacitor 24 through the first switching device 31, the discharge lamp 90, and the fourth switching device 34 in this order. On the other hand, when the second switching device 32 and the third switching device 33 are turned on, the drive current I is so produced that it flows from the one end of the capacitor 24 through the third switching device 33, the discharge lamp 90, and the second switching device 32 in this order.

In the present embodiment, the combination of the electric power control circuit 20 and the polarity reversing circuit 30 corresponds to a discharge lamp driver 230. That is, the discharge lamp driver 230 supplies the drive current I for driving the discharge lamp 90 to the discharge lamp 90.

The discharge lamp activating apparatus 10 further includes the controller 40. The controller 40 controls the discharge lamp driver 230. In the example shown in FIG. 4, the controller 40 controls the electric power control circuit 20 and the polarity reversing circuit 30 to control a holding period during which the drive current I keeps having the same polarity, the magnitude of the drive current I, the frequency thereof, and other parameters. The controller 40 controls the polarity reversing circuit 30 to perform polarity reversing control in which the holding period during which the drive current I keeps having the same polarity, the frequency of the drive current I, and other parameters are controlled based on the timings at which the polarity of the drive current I is reversed. The controller 40 further controls the electric power control circuit 20 to perform current control in which the magnitude of the outputted DC current Id is controlled.

The controller 40 is not necessarily configured in a specific manner. In the present embodiment, the controller 40 is formed of a system controller 41, an electric power control circuit controller 42, and a polarity reversing circuit controller 43. The entire or part of the controller 40 may be formed of a semiconductor integrated circuit.

The system controller 41 controls the electric power control circuit controller 42 and the polarity reversing circuit controller 43 to control the electric power control circuit 20 and the polarity reversing circuit 30. The system controller 41 may control the electric power control circuit controller 42 and the polarity reversing circuit controller 43 based on a drive voltage Vla and the drive current I detected by an action detector 60, which is provided in the discharge lamp activating apparatus 10 and will be described later.

In the present embodiment, the system controller 41 includes a storage section 44. The storage section 44 may alternatively be provided separately from the system controller 41.

The system controller 41 may control the electric power control circuit 20 and the polarity reversing circuit 30 based on information stored in the storage section 44. The storage section 44 may store information on drive parameters, such as the holding period during which the drive current I keeps having the same polarity, the magnitude of the drive current I, the frequency thereof, the waveform thereof, and a modulation pattern.

The electric power control circuit controller 42 controls the electric power control circuit 20 by outputting the current control signal to the electric power control circuit 20 based on a control signal from the system controller 41.

The polarity reversing circuit controller 43 controls the polarity reversing circuit 30 by outputting the polarity reversing control signals to the polarity reversing circuit 30 based on a control signal from the system controller 41.

Figure 5:
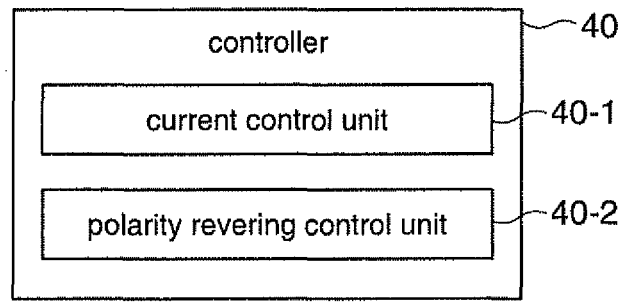
FIG. 5 describes another exemplary configuration of a controller.

To perform the control operations described above and a variety of other control operations described below, the controller 40 can be formed of a dedicated circuit or can alternatively function as a computer, for example, by using a CPU (central processing unit) to execute a control program stored in the storage section 44 or any other suitable device. FIG. 5 describes another example of the configuration of the controller 40. As shown in FIG. 5, the controller 40 may be configured to execute a control program and function as a current control unit 40-1 that controls the electric power control circuit 20 and a polarity reversing control unit 40-2 that controls the polarity reversing circuit 30.

Further, the controller 40 is configured to be part of the discharge lamp activating apparatus 10 in the example shown in FIG. 4, but the CPU 580 may alternatively be configured to provide part of the functions of the controller 40.

The discharge lamp activating apparatus 10 further includes the action detector 60. The action detector 60 includes a voltage detector 65 that detects the drive voltage Via for driving the discharge lamp 90 and outputs drive voltage information to the controller 40. The action detector 60 may further include a current detector that detects the drive current I flowing through the discharge lamp 90 and outputs drive current information to the controller 40. In the present embodiment, the action detector 60 is formed of a first resistor 61, a second resistor 62, and a third resistor 63.

In the present embodiment, the voltage detector 65 detects the drive voltage Vla based on a voltage obtained by the first resistor 61 and the second resistor 62, which are connected serially to each other and in parallel to the discharge lamp 90 and work as a voltage divider. Further, in the present embodiment, the current detector detects the drive current I based on a voltage induced across the third resistor 63 connected serially to the discharge lamp 90.

The discharge lamp activating apparatus 10 may further include an igniter circuit 70. The igniter circuit 70 operates only when the discharge lamp 90 is activated. In operation, the igniter circuit 70 supplies such a high voltage (higher than a voltage typically necessary to activate the discharge lamp 90) between the electrodes (between the first electrode 92 and the second electrode 93) of the discharge lamp 90 that dielectric breakdown occurs between the electrodes (between the first electrode 92 and the second electrode 93) of the discharge lamp 90 and a discharge path is formed at the time of activation of the discharge lamp 90. In the present embodiment, the igniter circuit 70 is connected in parallel to the discharge lamp 90.

Figure 6A:
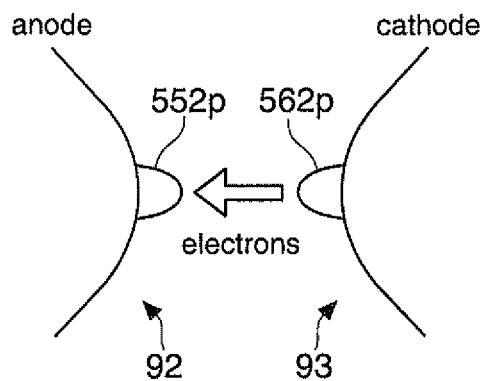
FIGS. 6A to 6D describe the relationship between the polarity of a drive current supplied to a discharge lamp and the temperatures of electrodes thereof.
Figure 6B:
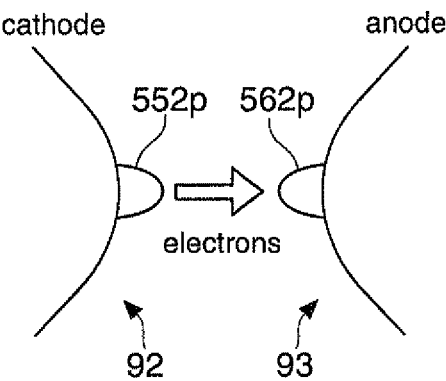

1-4. Relationship Between Polarity of Drive Current and Temperatures of Electrodes FIGS. 6A to 6D describe the relationship between the polarity of the drive current I supplied to the discharge lamp 90 and the temperatures of the electrodes thereof. FIGS. 6A and 6B show the first electrode 92 and the second electrode 93 in operation and front portions thereof. The front portions of the first electrode 92 and the second electrode 93 have protrusions 552$p$ and 562$p$. Discharge induced between the first electrode 92 and the second electrode 93 occurs primarily between the protrusions 552$p$ and 562$p$. In the present embodiment, the discharge position (arc position) shifts less between the first electrode 92 and the second electrode 93 than in a case where no protrusions are provided. The protrusions may alternatively be omitted.

FIG. 6A shows a first polarity state P1 in which the first electrode 92 acts as an anode and the second electrode 93 acts as a cathode. In the first polarity state P1, discharge causes electrons to move from the second electrode 93 (cathode) to the first electrode 92 (anode). The cathode (second electrode 93) emits electrons. The electrons emitted from the cathode (second electrode 93) collide with the front portion of the anode (first electrode 92). The collision generates heat, which increases the temperature of the front portion (protrusion 552$p$) of the anode (first electrode 92).

FIG. 68 shows a second polarity state P2 in which the first electrode 92 acts as the cathode and the second electrode 93 acts as the anode. In the second polarity state P2, electrons conversely move from the first electrode 92 to the second electrode 93, unlike in the first polarity state P1. As a result, the temperature of the front portion (protrusion 562$p$) of the second electrode 93 increases.

As described above, the temperature of the anode tends to be higher than that of the cathode. When the temperature of one of the electrodes is kept higher than that of the other, a variety of problems can occur. For example, when the front portion of the high-temperature electrode melts excessively, the electrode may deform in an unintended manner. As a result, the arc length may shift from an appropriate value in some cases. Further, when the front portion of the low-temperature electrode melts insufficiently, minute unmelted irregularities may be left in the front portion. As a result, what is called an arc jump may occur (the arc position is not stable but moves) in some cases.

Figure 6C:
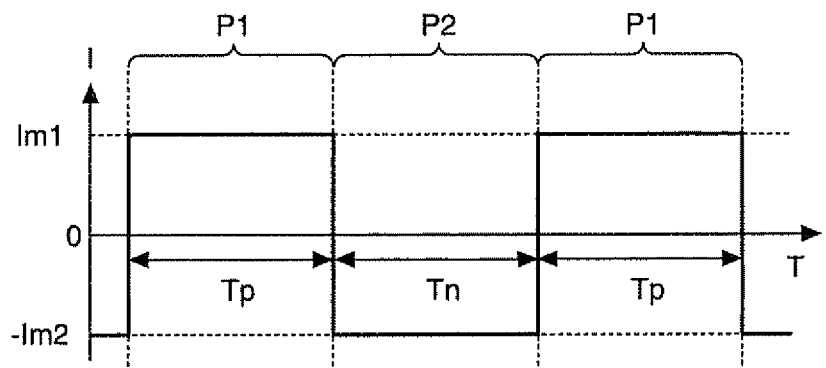

To solve the problems described above, an AC driving technique can be used to repeatedly switch the polarities of the electrodes. FIG. 6C shows a timing chart illustrating an example of the drive current I supplied to the discharge lamp 90 (FIG. 2). The horizontal axis represents time T, and the vertical axis represents the magnitude of the drive current I. The drive current I is the current flowing through the discharge lamp 90. The drive current I has a positive value in the first polarity state P1, whereas having a negative value in the second polarity state P2. In the example shown in FIG. 6C, a rectangular AC current is used as the drive current I. In the example shown in FIG. 6C, the first polarity state P1 and the second polarity state P2 are alternately repeated. A first polarity section Tp represents a period during which the first polarity state P1 continues, and a second polarity section Tn represents a period during which the second polarity state P2 continues. In the example shown in FIG. 6C, the average magnitude of the current is Im1 in each first polarity section Tp, and the average magnitude of the current is −Im2 in each second polarity section Tn. The frequency of the drive current I suitable for driving the discharge lamp 90 can be determined empirically in accordance with characteristics of the discharge lamp 90 (a value between 30 Hz and 1 kHz can be used, for example). Other values Im1, −Im2, Tp, and Tn can also be determined empirically.

Figure 6D:
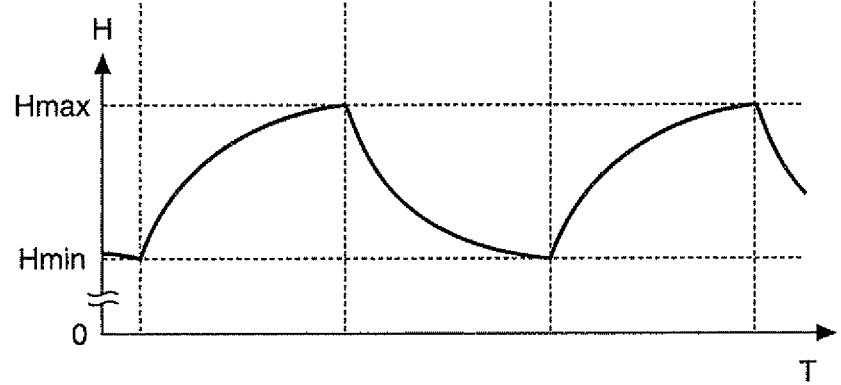

FIG. 6D shows a timing chart illustrating change in the temperature of the first electrode 92. The horizontal axis represents the time T, and the vertical axis represents the temperature H. The temperature H of the first electrode 92 increases in each first polarity state P1, whereas decreasing in each second polarity state P2. Since the first polarity state P1 and the second polarity state P2 are repeated, the temperature H changes periodically between a minimum Hmin and a maximum Hmax. Although not shown, the temperature of the second electrode 93 changes in a way similar to the temperature H of the first electrode 92 but in an opposite phase. That is, the temperature of the second electrode 93 decreases in each first polarity state P1, whereas increasing in each second polarity state P2.

In the first polarity state P1, since the front portion of the first electrode 92 (protrusion 552p) melts and hence becomes smooth, the discharge position at the first electrode 92 will not move. Further, since the temperature of the front portion of the second electrode 93 (protrusion 562p) decreases, the second electrode 93 (protrusion 562p) will not melt excessively, whereby the electrode will not deform in an unintended manner. In the second polarity state P2, the first electrode 92 and the second electrode 93 behave the other way around. Repeating the two states P1 and P2 therefore solves the problems with the first electrode 92 and the second electrode 93 described above.

When the waveform of the current I is symmetric, that is, when the waveform of the current I satisfies the following conditions: "|Im1|=|−Im2| and Tp=Tn," the electric power is supplied to the first electrode 92 and the second electrode 93 in the same condition. The difference in temperature between the first electrode 92 and the second electrode 93 is therefore estimated to be small when thermal conditions of the first electrode 92 and the second electrode 93 (how readily the temperatures of the electrodes increase or decrease) are the same. When the thermal conditions of the first electrode 92 and the second electrode 93 differ from each other, the protrusion at the front portion of the electrode exposed to a condition where the temperature thereof readily becomes higher possibly melts away. If the protrusion at the front portion of the electrode melts away, the start point of the arc may become unstable and the electrode may further deform.

Further, the front portion of the electrode exposed to a condition where the temperature thereof readily becomes higher may experience evaporation of its excessive material, which may adhere to a sealing body of the discharge lamp, resulting in possible blackening and needle crystal formation.

Further, when a wide area of either of the electrodes is excessively heated (when the size of the arc spot (hot spot formed on the surface of the electrode in association with arc discharge) increases), the electrode excessively melts and the shape thereof deforms. Conversely, when the electrode becomes too cold (when the size of the arc spot decreases), the front portion of the electrode melts insufficiently. In this case, the front portion will not return to a smooth state, that is, the front portion of the electrode tends to deform. As described above, when energy continues to be constantly supplied to the electrodes, the front portions (protrusions 552p and 562p) of the electrodes tend to deform into unintended shapes.

1-5. Example of How to Control Drive Current and Drive Electric Power

A description will next be made of a specific example of how to control the drive current I in the projector 500 according to the present embodiment.

Figure 7:
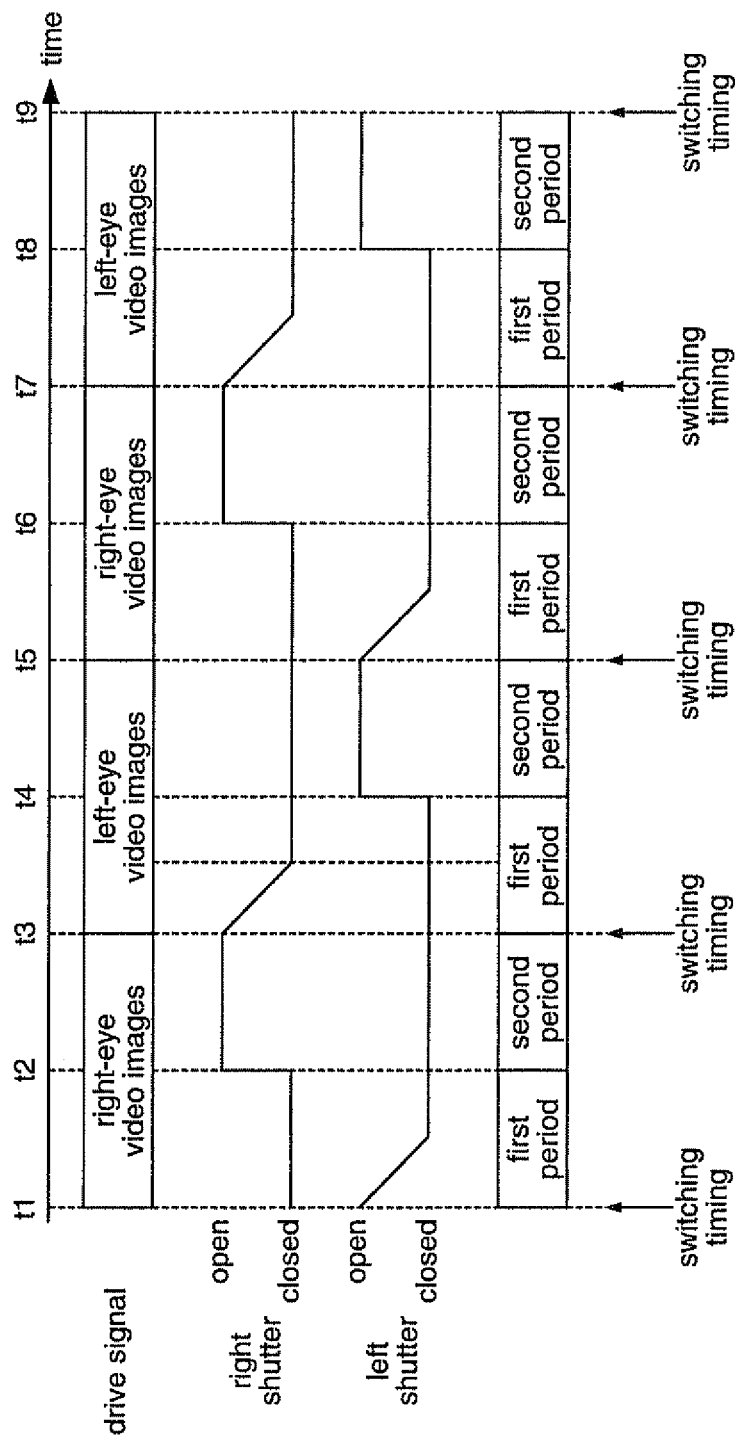
FIG. 7 describes a first period, a second period, and switching timings.

FIG. 7 describes a first period, a second period, and switching timings. FIG. 7 shows the relationship among the following items along the temporal axis: video images carried by the drive signals 572R, 572G, and 572B, the open/close state of the right shutter 412, the open/close state of the left shutter 414, the first and second periods, and the switching timings shown in this order from above to below. The horizontal axis in FIG. 7 represents time.

In the example shown in FIG. 7, the drive signals 572R, 572G, and 572B carry right-eye video images during the period from time t1 to time t3, left-eye video images during the period from time t3 to time t5, right-eye video images during the period from time t5 to time t7, and left-eye video images during the period from time t7 to time t9. In the example shown in FIG. 7, the projector 500 therefore switches video images between right-eye and left-eye video images and alternately outputs them in accordance with the switching timings at the time t1, t3, t5, t7, and t9.

The period sandwiched between temporally adjacent switching timings starts with a first period and ends with a second period. In the example shown in FIG. 7, the period sandwiched between the time t1 and the time t3, which are switching timings, for example, starts with the first period from the time t1 to the time t2 and ends with the second period from the time t2 to the time t3. The same holds for the period sandwiched between the time t3 and the time t5, which are switching timings, the period sandwiched between the time t5 and the time t7, which are switching timings, and the period sandwiched between the time t7 and the time t9, which are switching timings. In the example shown in FIG. 7, the length of the first period is equal to the length of the second period, but the lengths of the first and second periods can be appropriately set as required. Further, a third period may be present between the first and second periods. The drive current I may be controlled in the third period differently from the way in the first and second periods, which will be described later.

The right shutter 412 is open in at least part of the period during which the drive signals 572R, 572G, and 572B carrying right-eye video images are inputted to the liquid crystal panels 560R, 560G, and 560B. In the example shown in FIG. 7, the right shutter 412 is closed from the time t1 to the time t2 and open from the time t2 to the time t3. In the example shown in FIG. 7, in the period during which the drive signals 572R, 572G, and 572B carrying left-eye video images are inputted to the liquid crystal panels 560R, 560G, and 560B, the right shutter 412 starts being closed at the time t3, stops being closed in between the time t3 and the time t4, and remains closed from the time t4 to the time t5. The open/close state of the right shutter 412 from the time t5 to the time t9 changes in the same manner as the open/close state from the time t1 to the time t5 changes.

The left shutter 414 is open in at least part of the period during which the drive signals 572R, 572G, and 572B carrying left-eye video images are inputted to the liquid crystal panels 560R, 560G, and 560B. In the example shown in FIG. 7, the left shutter 414 is closed from the time t3 to the time t4 and open from the time t4 to the time t5. In the example shown in FIG. 7, in the period during which the drive signals 572R, 572G, and 572B carrying right-eye video images are inputted to the liquid crystal panels 560R, 560G, and 560B, the left shutter 414 starts being closed at the time t1, stops being closed in between the time t1 and the time t2, and remains closed from the time t2 to the time t3. The open/close state of the left shutter 414 from the time t5 to the time t9 changes in the same manner as the open/close state from the time t1 to the time t5 changes.

In the example shown in FIG. 7, in the period during which the drive signals 572R, 572G, and 572B carrying right-eye video images are inputted to the liquid crystal panels 560R, 560G, and 560B, the period during which the right shutter 412 is closed is the first period, and the period during which the right shutter 412 is open is the second period. Further, in the example shown in FIG. 7, in the period during which the drive signals 572R, 572G, and 572B carrying left-eye video images are inputted to the liquid crystal panels 560R, 560G, and 560B, the period during which the left shutter 414 is closed is the first period, and the period during which the left shutter 414 is open is the second period. Moreover, in the example shown in FIG. 7, a period during which both the right shutter 412 and the left shutter 414 are closed is present in the first period.

Figure 8:
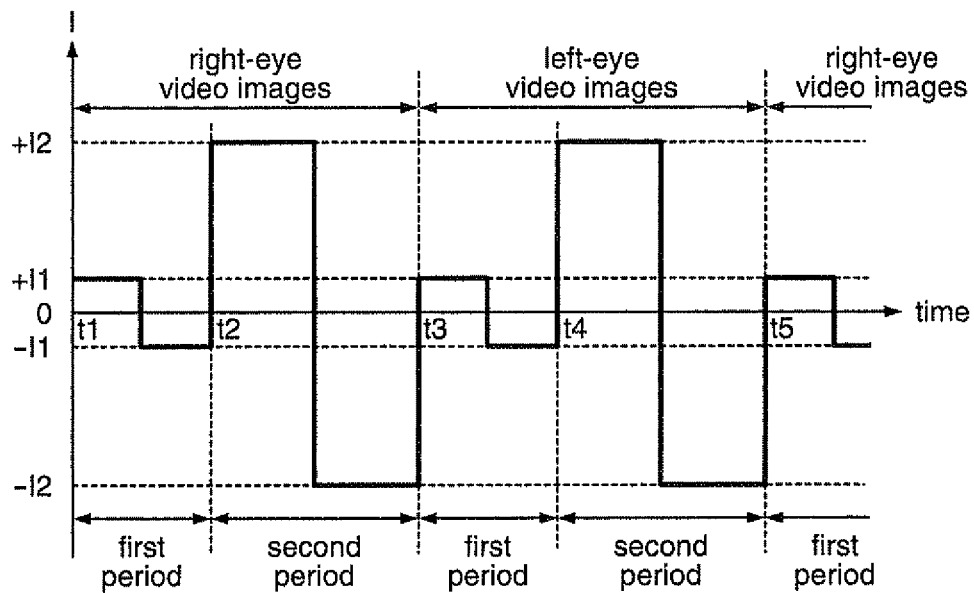
FIG. 8 shows a timing chart illustrating an example of the waveform of the drive current in the present embodiment.

FIG. 8 shows a timing chart illustrating an example of the waveform of the drive current I in the present embodiment. The horizontal axis represents time, and the vertical axis represents the magnitude of the drive current I. In FIG. 8, the drive current I has a positive value when the second electrode 93 acts as the anode, whereas the drive current I has a negative value when the first electrode 92 acts as the anode. Further, in the following description, the drive current I is of positive polarity when the second electrode 93 acts as the anode, whereas the drive current I is of negative polarity when the first electrode 92 acts as the anode.

In the projector 500 according to the present embodiment, the controller 40 carries out a first control process in which the discharge lamp driver 230 is so controlled not only that the absolute magnitude of the drive current I in each first period is smaller than that in each second period and the absolute magnitude of the drive current I in each second period is greater than that in each first period but also that an AC current is supplied as the drive current I to the discharge lamp 90 in each second period.

In the example shown in FIG. 8, the absolute magnitude of the drive current I is I1 in the first period from the time t1 to the time t2, I2 in the second period from the time t2 to the time t3, I1 in the first period from the time t3 to the time t4, I2 in the second period from the time t4 to the time t5, and I1 in the first period after the time t5. Further, in the example shown in FIG. 8, I1<I2. The absolute magnitude of the drive current I is therefore relatively small in each first period whereas being relatively large in each second period.

In the example shown in FIG. 8, the absolute magnitude of the drive current I is fixed in each of the first and second periods, but the absolute magnitude of the drive current I is not necessarily be fixed. For example, when the absolute magnitude of the drive current I changes in each of the first and second periods, the controller 40 may control the discharge lamp driver 230 in such a way that the average absolute magnitude of the drive current I is relatively small in each first period whereas being relatively large in each second period. Alternatively, for example, when the absolute magnitude of the drive current I changes in each of the first and second periods, the controller 40 may control the discharge lamp driver 230 in such a way that the absolute magnitude of the drive current I decreases to a minimum in each first period whereas increasing to a maximum in each second period.

In the projector 500 according to the present embodiment, the controller 40 carries out a second-period AC control process, which is part of the first control process and in which the discharge lamp driver 230 is controlled to supply an AC current as the drive current I to the discharge lamp 90 in each second period.

In the second-period AC control process in the example shown in FIG. 8, the controller 40 so controls the discharge lamp driver 230 to supply an AC current as the drive current I to the discharge lamp 90 in the second period from the time t2 to the time t3 and the second period from the time t4 to the time t5. In the second-period AC control process in the example shown in FIG. 8, the controller 40 controls the discharge lamp driver 230 to produce an AC current corresponding to a single cycle by reversing the polarity of the drive current I while keeping the absolute magnitude of the drive current I fixed in each second period and supply the produced AC current as the drive current I to the discharge lamp 90. The frequency of the drive current I in the second-period AC control process can be determined empirically in accordance with characteristics of the discharge lamp 90. For example, the frequency of the drive current I may be a value between 30 Hz and 1 kHz.

In the projector 500 according to the present embodiment, the controller 40 carries out a first electric power control process, which is part of the first control process and in which first average drive electric power W1 is determined based on the drive voltage Vla detected by the voltage detector 65 and the discharge lamp driver 230 is controlled to supply the drive current I to the discharge lamp 90 in such a way that average drive electric power is set at the first average drive electric power W1. The average drive electric power in the first electric power control process is the average of the drive electric power for driving the discharge lamp 90 in the periods during which the first control process is carried out by using the same first average drive electric power W1.

Figure 9A:
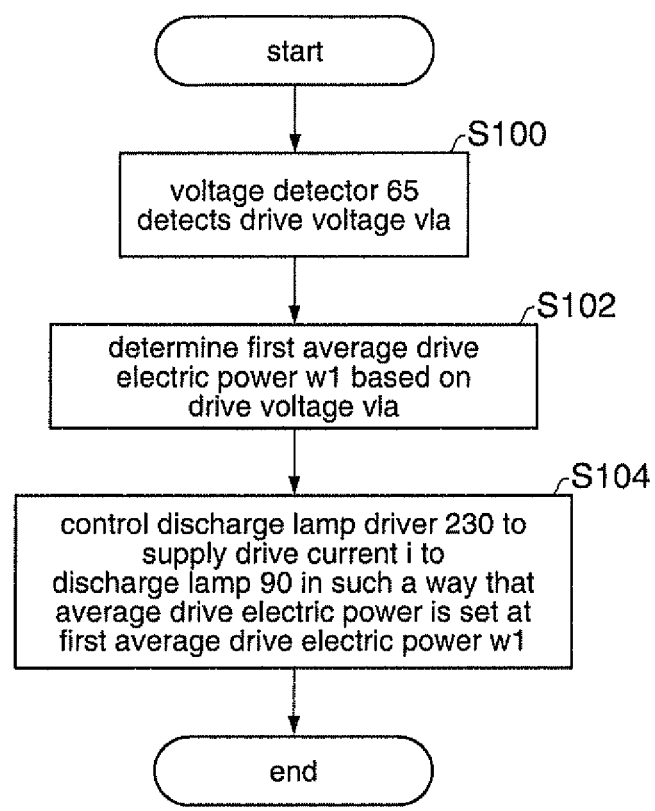
FIG. 9A is a flowchart for describing a first electric power control process.

FIG. 9A is a flowchart for describing the first electric power control process.

The voltage detector 65 first detects the drive voltage Vla (step S100). The controller 40 then determines the first average drive electric power W1 based on the drive voltage Vla detected by the voltage detector 65 (step S102). In the present embodiment, the controller 40 receives drive voltage information outputted from the voltage detector 65 and determines the first average drive electric power W1 based on the received drive voltage information.

Figure 10:
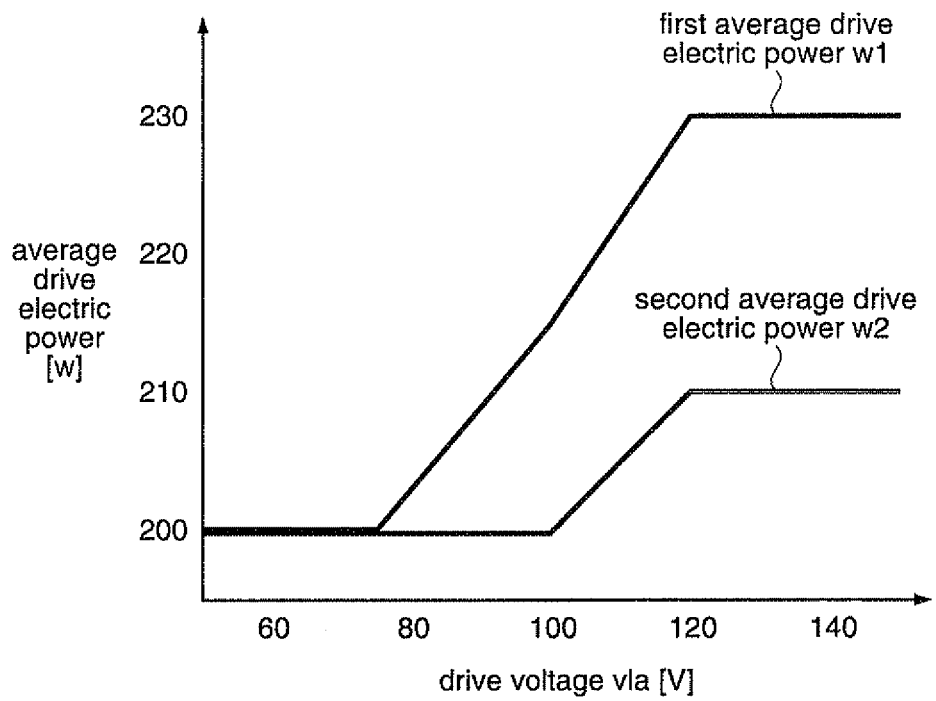
FIG. 10 shows graphs illustrating an example of the relationship of a drive voltage with first average drive electric power and second average drive electric power.

FIG. 10 shows a graph illustrating an example of the relationship between the drive voltage Vla and the first average drive electric power W1. In the example shown in FIG. 10, the first average drive electric power W1 is 200 W when the drive voltage Vla is lower than 75 V. The first average drive electric power W1 linearly increases from 200 to 215 W when the drive voltage Vla increases from 75 V inclusive to 100 V exclusive. The first average drive electric power W1 linearly increases from 215 to 230 W when the drive voltage Vla increases from 100 V inclusive to 120 V exclusive. The first average drive electric power W1 is 230 W when the drive voltage Vla is higher than or equal to 120 V. The relationship between the drive voltage Via and the first average drive electric power W1 shown in FIG. 10 may, for example, be stored in the storage section 44 in the controller 40. In step S102, the controller 40 may refer to the relationship between the drive voltage Vla and the first average drive electric power W1 stored in the storage section 44 and determine the first average drive electric power W1 based on the drive voltage Vla.

After step S102, the controller 40 controls the discharge lamp driver 230 to supply the drive current I to the discharge lamp 90 in such a way that the average drive electric power is set at the first average drive electric power W1 (step S104). In the present embodiment, the controller 40 controls the discharge lamp driver 230 to supply the drive current I to the discharge lamp 90 by controlling the electric power control circuit 20 in such a way that the average drive electric power is set at the first average drive electric power W1.

In the projector 500 according to the present embodiment, since the controller 40 so controls the discharge lamp driver 230 that the absolute magnitude of the drive current I decreases to a minimum in each first period whereas increasing to a maximum in each second period, driving the discharge lamp 90 with the average drive electric power over first and second periods fixed not only allows projected video images to be darker in each first period than in a case where the discharge lamp 90 is driven at the average drive electric power but also allows projected video images to be brighter in each second period than in a case where the discharge lamp 90 is driven at the average drive electric power. Since each first period has the period during which both the right shutter 412 and the left shutter 414 are closed, the quality of projected video images is unlikely affected even when they are dark. On the other hand, since either the right shutter 412 or the left shutter 414 is open in each second period, projected video images viewed by a user can be made brighter than in a case where the discharge lamp 90 is driven at the average drive electric power. The projector can therefore make projected stereoscopic video images appear bright. Further, the degree of crosstalk can be reduced by making projected video images dark in each first period.

Further, in the projector 500 according to the present embodiment, since the controller 40 carries out the second-period AC control process, in which the discharge lamp driver 230 is controlled to supply an AC current as the drive current I to the discharge lamp 90 in each second period, the amount of wear of the electrodes of the discharge lamp 90 can be reduced.

Further, in the projector 500 according to the present embodiment, the controller 40 carries out the first electric power control process, in which the first average drive electric power W1 is determined based on the drive voltage Vla detected by the voltage detector 65 and the discharge lamp driver 230 is controlled to supply the drive current I to the discharge lamp 90 in such a way that the average drive electric power is set at the first average drive electric power W1. In general, when the electrodes of the discharge lamp 90 wear, the distance between the electrodes increases and the drive voltage Vla increases accordingly. The discharge lamp 90 can therefore be driven in accordance with the state of wear of the electrodes of the discharge lamp 90 by determining the first average drive electric power W1 based on the drive voltage Vla. The amount of wear of the electrodes of the discharge lamp 90 can therefore be further reduced.

In the projector 500 according to the present embodiment, when judgment made by the video image information judgment unit 520 shows that video image information to be projected is stereoscopic video image information, the controller 40 may carryout the first control process. In the present embodiment, the controller 40 may receive judgment made by the video image information judgment unit 520 carried by the communication signal 582 from the CPU 580.

As described with reference to FIG. 8, when video image information to be projected is stereoscopic video image information, the discharge lamp driver 230 is so controlled that the absolute magnitude of the drive current I in each first period is smaller than that in each second period. As a result, since the temperatures of the electrodes become lower in each first period, the protrusions of the electrodes melt insufficiently. In view of this fact, when video image information to be projected is stereoscopic video image information, it is preferable to give special consideration to the drive electric power as well. When stereoscopic video image information, which causes a large amount of wear of the electrodes of the discharge lamp 90, is projected, the amount of wear of the electrodes of the discharge lamp 90 can be reduced by carrying out the first control process.

In the projector 500 according to the present embodiment, when the voltage detector 65 detects a high drive voltage Vla, the first average drive electric power W1 may also be set at a high value. In the example shown in FIG. 10, when the voltage detector 65 detects a high drive voltage Vla, the first average drive electric power W1 is also set at a high value.

When video image information to be projected is stereoscopic video image information, the temperatures of the electrodes become low in each first period, and hence the protrusions of the electrodes melt insufficiently. When the electrodes wear and the drive voltage Vla increases accordingly, the drive current I decreases and hence the amount of melted protrusions of the electrodes becomes more insufficient. In view of this fact, when the voltage detector 65 detects a high drive voltage Vla, the amount of wear of the electrodes of the discharge lamp 90 can be reduced by increasing the first average drive electric power W1 in accordance with the state of wear of the electrodes of the discharge lamp 90. Further, decrease in brightness of the discharge lamp 90 can also be reduced.

In the projector 500 according to the present embodiment, the controller 40 may carryout a first-period AC control process, which is part of the first control process and in which the discharge lamp driver 230 is controlled to supply an AC current as the drive current I to the discharge lamp 90 in each first period. The frequency of the drive current I in the first-period AC control process can be determined empirically in accordance with characteristics of the discharge lamp 90. For example, the frequency of the drive current I may be a value between 30 Hz and 1 kHz.

In the example shown in FIG. 8, the drive current I is an AC current in each of the first and second periods.

In general, when the temperatures of the electrodes are low, flickering tends to occur. To prevent flickering, it is preferable to drive the discharge lamp 90 with an AC current instead of a DC current. Flickering will therefore not occur in each first period, in which the temperatures of the electrodes of the discharge lamp become low, by supplying an AC current as the drive current I to the discharge lamp 90 in each of the first and second periods in the first control process.

Further, in the projector 500 according to the present embodiment, the controller 40 may control the discharge lamp driver 230 in the first-period AC control process to supply an AC current having a frequency higher than that of an AC current in the second-period AC control process as the drive current I to the discharge lamp 90.

In the example shown in FIG. 8, the drive current I in each first period is an AC current having a frequency higher than that of the drive current I in each second period.

In general, when the temperatures of the electrodes are low, the discharge start point between the electrodes can be stabilized by driving the discharge lamp with a high-frequency AC current. In the first-period AC control process, supplying an AC current having a frequency higher than that of an AC current in the second-period AC control process as the drive current I to the discharge lamp 90 further prevents flickering in each first period, in which the temperatures of the electrodes of the discharge lamp become low.

1-6. Variation 1

In a projector 500 according to Variation 1 of the present embodiment, when judgment made by the video image information judgment unit 520 shows that video image information to be projected is not stereoscopic video image information, the controller 40 carries out a second control process in which the discharge lamp driver 230 is controlled to supply an AC current as the drive current I to the discharge lamp 90. Further, in the second control process, the controller 40 carries out a second electric power control process in which second average drive electric power W2 is determined based on the drive voltage Vla detected by the voltage detector 65 and the discharge lamp driver 230 is controlled to supply the drive current I to the discharge lamp 90 in such a way that the average drive electric power is set at the second average drive electric power W2. The controller 40 determines the first average drive electric power W1 and the second average drive electric power W2 by using different references in the first electric power control process and the second electric power control process.

Figure 11:
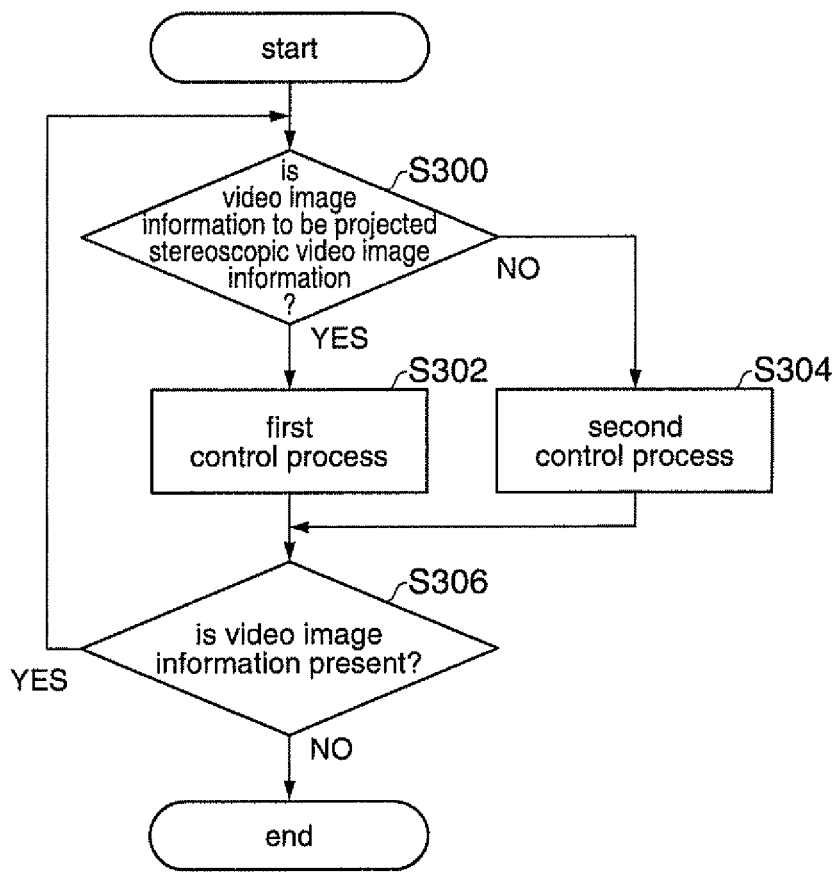
FIG. 11 is a flowchart for describing actions of a projector according to Variation 1 of the present embodiment.

FIG. 11 is a flowchart for describing actions of the projector 500 according to Variation 1 of the present embodiment.

The video image information judgment unit 520 first judges whether or not video image information to be projected is stereoscopic video image information (step S300). When the judgment made by the video image information judgment unit 520 shows that the video image information is stereoscopic video image information (YES in step S300), the controller 40 carries out the first control process (step S302). The details of the first control process have been described in the section "1-5. Example of how to control drive current and drive electric power."

In step S300, when the judgment made by the video image information judgment unit 520 shows that the video image information is not stereoscopic video image information (NO in step S300), the controller 40 carries out the second control process (step S304). The case where the video image information is not stereoscopic video image information is, for example, a case where the video image information is planar video image information (video image information formed of right-eye video images and left-eye video images that are not required to be switched or alternately outputted).

Figure 12:
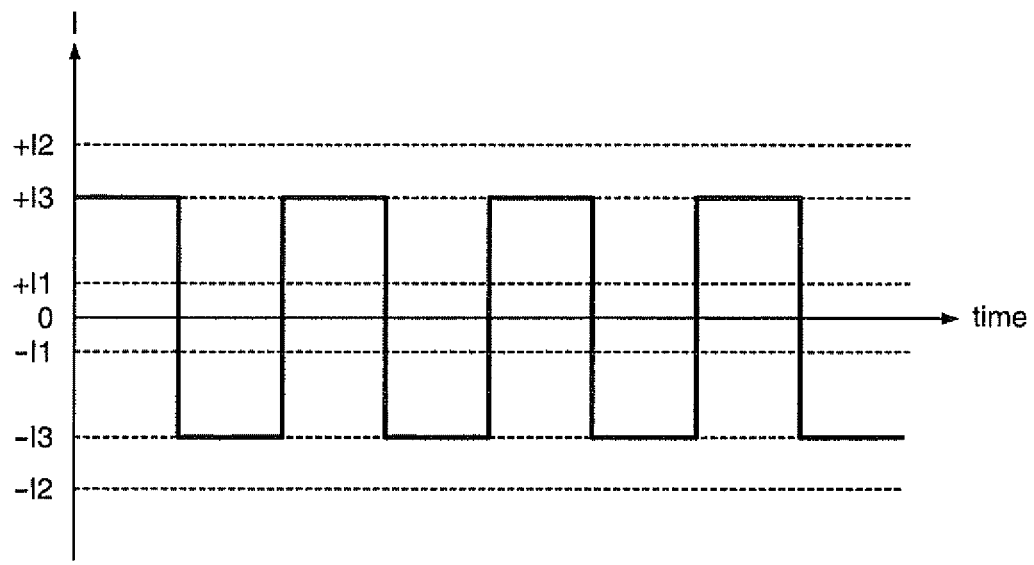
FIG. 12 shows a timing chart illustrating an example of the waveform of the drive current in a second control process.

FIG. 12 shows a timing chart illustrating an example the waveform of the drive current I in the second control process. The horizontal axis represents time, and the vertical axis represents the magnitude of the drive current I. In FIG. 12, the drive current I has a positive value when the second electrode 93 acts as the anode, whereas the drive current I has a negative value when the first electrode 92 acts as the anode.

In the second control process, the controller 40 controls the discharge lamp driver 230 to supply an AC current as the drive current I to the discharge lamp 90. In the example shown in FIG. 12, the controller 40 controls the discharge lamp driver 230 to produce an AC current by reversing the polarity of the drive current I at periodic timings while keeping the absolute magnitude of the drive current I fixed at I3 and supply the AC current as the drive current I to the discharge lamp 90. For example, when the drive voltage Vla and the drive electric power for driving the discharge lamp 90 are the same in the first control process and the second control process, the following expression is satisfied: I1<I3<I2.

The waveform of the AC current is not limited to that shown in FIG. 12. For example, the waveform may be so shaped that the absolute magnitude of the drive current I immediately before the timing when the polarity of the drive current I is reversed is greater than that immediately after the timing when the polarity of the drive current I is reversed. The frequency f the drive current I can be determined empirically in accordance with characteristics of the discharge lamp 90. For example, the frequency of the drive current I may be a value between 30 Hz and 1 kHz.

In the second control process, the controller 40 carries out the second electric power control process, in which the second average drive electric power W2 is determined based on the drive voltage Vla detected by the voltage detector 65 and the discharge lamp driver 230 is controlled to supply the drive current I to the discharge lamp 90 in such a way that the average drive electric power is set at the second average drive electric power W2. The average drive electric power in the second electric power control process is the average of the drive electric power for driving the discharge lamp 90 in the periods during which the second control process is carried out by using the same second average drive electric power W2.

Figure 9B:
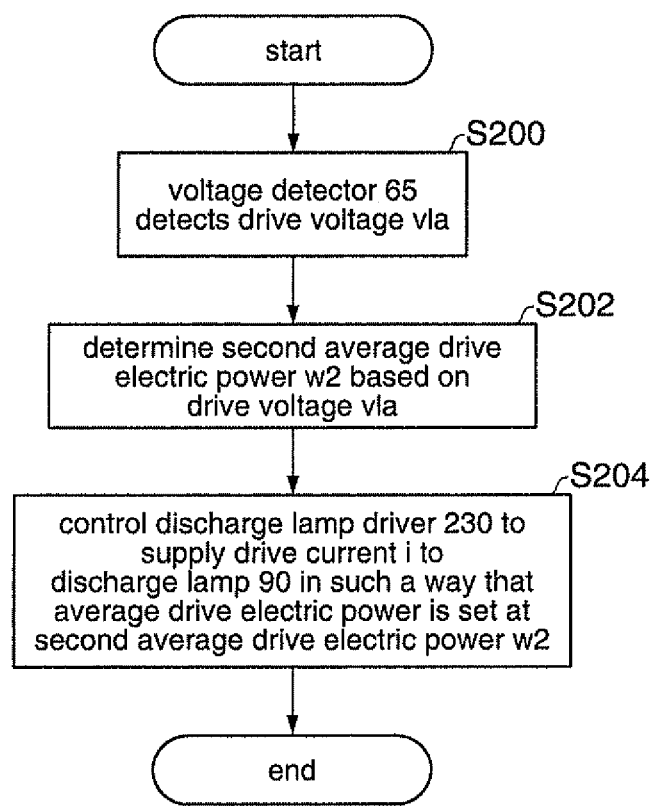
FIG. 9B is a flowchart for describing a second electric power control process.

FIG. 9B is a flowchart for describing the second electric power control process.

The voltage detector 65 first detects the drive voltage Vla (step S200). The controller 40 then determines the second average drive electric power W2 based on the drive voltage Vla detected by the voltage detector 65 (step S202). In the present embodiment, the controller 40 receives drive voltage information outputted from the voltage detector 65 and determines the second average drive electric power W2 based on the received drive voltage information.

FIG. 10 shows graphs illustrating an example of the relationship of the drive voltage Vla with the first average drive electric power W1 and the second average drive electric power W2. In the example shown in FIG. 10, the second average drive electric power W2 is 200 W when the drive voltage Vla is lower than 100 V. The second average drive electric power W2 linearly increases from 200 to 210 W when the drive voltage Vla increases from 100 V inclusive to 120 V exclusive. The second average drive electric power W2 is 210 W when the drive voltage Vla is higher than or equal to 120 V. The relationship between the drive voltage Vla and the second average drive electric power W2 shown in FIG. 10 may, for example, be stored in the storage section 44 in the controller 40. In step S202, the controller 40 may refer to the relationship between the drive voltage Vla and the second average drive electric power W2 stored in the storage section 44 and determine the second average drive electric power W2 based on the drive voltage Vla.

The first average drive electric power W1 and the second average drive electric power W2 are determined by using different references in the first electric power control process and the second electric power control process, as shown in FIG. 10.

After step S202, the controller 40 controls the discharge lamp driver 230 to supply the drive current I to the discharge lamp 90 in such a way that the average drive electric power is set at the second average drive electric power W2 (step S204). In the present embodiment, the controller 40 controls the discharge lamp driver 230 to supply the drive current to the discharge lamp 90 by controlling the electric power control circuit 20 in such a way that the average drive electric power is set at the second average drive electric power W2.

In FIG. 11, after the first control process (step S302) or the second control process (step S304) is carried out, the video image information judgment unit 520 judges whether or not video image information is present (step S306). When the judgment made by the video image information judgment unit 520 shows that video image information is present (YES in step S306), the process returns to step S300, and the actions in steps S300 to S306 are repeated in the same manner. When the judgment made by the video image information judgment unit 520 shows that no video image information is present (NO in step S306), the projector 500 terminates projection of video images.

Since the projector 500 according to Variation 1 of the present embodiment determines the first average drive electric power W1 and the second average drive electric power W2 by using different references in the first electric power control process and the second electric power control process, the discharge lamp 90 can be driven by using appropriate drive electric power when stereoscopic video image information, which causes a large amount of wear of the electrodes of the discharge lamp 90, is projected, whereas the discharge lamp 90 can be driven by using another appropriate drive electric power when another type of information is projected.

In the projector 500 according to Variation 1 of the present embodiment, the controller 40 may determine the first average drive electric power W1 and the second average drive electric power W2 in such a way that the first average drive electric power W1 is greater than or equal to the second average drive electric power W2. In the example shown in FIG. 10, the first average drive electric power W1 is greater than or equal to the second average drive electric power W2 throughout the drive voltage Vla.

As described with reference to FIG. 8, when video image information to be projected is stereoscopic video image information, the discharge lamp driver 230 is so controlled that the absolute magnitude of the drive current I in each first period is smaller than that in each second period. When the drive voltage Vla and the drive electric power for driving the discharge lamp 90 are the same in the first control process and the second control process, the absolute magnitude of the drive current in each first period in the first control process is smaller than the absolute magnitude of the drive current in the second control process. As a result, since the temperatures of the electrodes become low in each first period, the protrusions of the electrodes melt insufficiently. When video image information to be projected is stereoscopic video image information, it is preferable to give special consideration to the drive electric power as well. The amount of wear of the electrodes of the discharge lamp 90 can be reduced by determining the first average drive electric power W1 and the second average drive electric power W2 in such a way that the first average drive electric power W1 is greater than or equal to the second average drive electric power W2.

In the projector 500 according to Variation 1 of the present embodiment, when the voltage detector 65 detects a high drive voltage Vla, at least one of the first average drive electric power W1 and the second average drive electric power W2 may be set at a high value. In the example shown in FIG. 10, when the drive voltage Vla has a high value, both the first average drive electric power W1 and the second average drive electric power W2 are set at high values.

When the electrodes wear and the drive voltage Vla increases accordingly, the drive current I decreases and hence the protrusions of the electrodes melt insufficiently. In view of this fact, when the voltage detector 65 detects a high drive voltage Vla, the amount of wear of the electrodes of the discharge lamp 90 can be reduced by increasing at least one of the first average drive electric power W1 and the second average drive electric power W2 in accordance with the state of wear of the electrodes of the discharge lamp 90. Further, decrease in brightness of the discharge lamp 90 can also be reduced.

1-7. Variation 2

Figure 13:
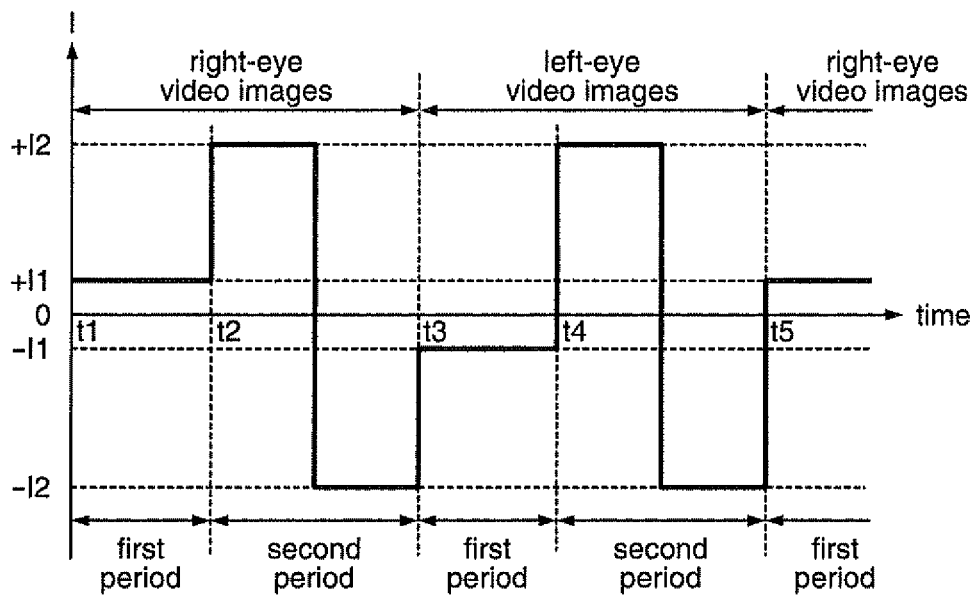
FIG. 13 shows a timing chart illustrating an example of the waveform of the drive current in Variation 2 of the present embodiment.

FIG. 13 shows a timing chart illustrating an example of the waveform of the drive current I in Variation 2 of the present embodiment. The horizontal axis represents time, and the vertical axis represents the magnitude of the drive current I. In FIG. 13, the drive current I has a positive value when the second electrode 93 acts as the anode, whereas the drive current I has a negative value when the first electrode 92 acts as the anode.

In the projector 500 according to Variation 2 of the present embodiment, the controller 40 may carry out a first-period DC control process, which is part of the first control process and in which the discharge lamp driver 230 is controlled to supply a DC current as the drive current I to the discharge lamp 90 in each first period. In the first-period DC control process, the discharge lamp driver 230 may be controlled to supply the discharge lamp 90 with DC currents of opposite polarities as the drive current I, one in a first period and the other in the temporally next first period with a second period therebetween, respectively.

In the example shown in FIG. 13, the drive current I is a positive-polarity DC current in the first period from the time t1 to the time t2, a negative-polarity DC current in the first period from the time t3 to the time t4, and a positive-polarity DC current in the first period after the time t5. That is, in a first period and the temporally next first period (the first period from the time t1 to the time t2 and the first period from the time t3 to the time t4, for example) with a second period therebetween (the second period from the time t2 to the time t3, for example), the controller 40 controls the discharge lamp driver 230 to supply the discharge lamp 90 with DC currents of the opposite polarities as the drive current I.

Performing the control described above allows the thermal load to be balanced between the first electrode 92 and the second electrode 93 of the discharge lamp 90. Unbalanced wear of the electrodes of the discharge lamp 90 can therefore be suppressed.

2. Experimental Example

A description will next be made of an experimental example using the projector 500 according to Variation 1 of the present embodiment.

In the present experiment using a discharge lamp driven at a drive voltage of 70 V in an initial state, the experiment was so conducted that the electrodes of the discharge lamp wore to a point where the drive voltage for driving the discharge lamp increased to 110 V. Further, in the present experiment, the shapes of the electrodes of the discharge lamp were estimated and evaluated based on variation in the drive voltage for driving the discharge lamp and the brightness thereof obtained when the first and second control processes were carried out at certain drive electric power. Table 1 shows evaluation results obtained in the present experiment.

TABLE 1

| Drive electric power | Shapes of protrusions | |
|---|---|---|
| | First control process | Second control process |
| 200 W | bad | fair |
| 210 W | fair | good |
| 220 W | fair | good |
| 230 W | good | good |

In Table 1, "good" indicates that the shapes of the protrusions recovered and stable arc discharge was formed. "Fair" indicates that the shapes of the protrusions were maintained. "Bad" indicates that the protrusions collapsed and the distance between the electrodes increased.

The results shown in Table 1 show that it is preferable to determine the drive electric power by using different references in the first control process and the second control process. It is further shown that the drive electric power in the first control process is preferably higher than or equal to the drive electric power in the second control process.

In the above embodiment and variations, the description has been made with reference to a projector using three liquid crystal panels, but the invention is not limited thereto. The invention is also applicable to a projector using one liquid crystal panel, a projector using two liquid crystal panels, and a projector using four or more liquid crystal panels.

In the above embodiment and variations, the description has been made with reference to a transmissive projector, but the invention is not limited thereto. The invention is also applicable to a reflective projector. The word "transmissive" used herein means that a light modulation unit is a light-transmissive electro-optic modulator, such as a transmissive liquid crystal panel, and the word "reflective" used herein means that the light modulation unit is a light-reflective electro-optic modulator, such as a reflective liquid crystal panel and a micromirror light modulator. For example, a DMD (digital micromirror device: a trademark of Texas Instruments Incorporated) can be used as the micromirror light modulator. When the invention is applied to a reflective projector, the same advantageous effects as those provided in a transmissive projector can also be provided.

The invention is applicable not only to a front projection projector that projects a projection image from the observation side but also to a rear projection projector that projects a projection image from the side opposite the observation side.

The invention is not limited to the embodiment described above, but a variety of variations can be implemented within a scope of the substance of the invention.

The scope of the invention encompasses substantially the same configurations as the configuration described in the above embodiment (for example, a configuration having the same function, using the same method, and providing the same result and a configuration having the same purpose and providing the same effect). Further, the scope of the invention encompasses a configuration in which an inessential portion of the configuration described in the above embodiment is replaced. Moreover, the scope of the invention encompasses a configuration that provides the same advantageous effect as that provided in the configuration described in the above embodiment or a configuration that can achieve the same purpose. Further, the scope of the invention encompasses a configuration in which a known technology is added to the configuration described in the above embodiment.

The entire disclosure of Japanese Patent Application No. 2010-183711, filed Aug. 19, 2010 is expressly incorporated by reference herein.

What is claimed is:

1. A projector that switches video images between right-eye and left-eye video images at predetermined switching timings and alternately outputs the right-eye and left-eye video images, the projector comprising:
a discharge lamp;
a discharge lamp driver that supplies the discharge lamp with a drive current for driving the discharge lamp;
a voltage detector that detects a drive voltage for driving the discharge lamp; and
a controller that controls the discharge lamp driver,
wherein a period sandwiched between temporally adjacent ones of the switching timings starts with a first period and ends with a second period,
the controller carries out a first control process in which the discharge lamp driver is so controlled that an absolute magnitude of the drive current in the first period is smaller than that in the second period and that an AC current is supplied as the drive current to the discharge lamp in the second period, and
the first control process includes a first electric power control process in which first average drive electric power is determined based on the drive voltage detected by the voltage detector and the discharge lamp driver is controlled to supply the drive current to the discharge lamp in such a way that average drive electric power is set at the first average drive electric power.

2. The projector according to claim 1, further comprising:
a video image information judging unit that judges whether or not video image information to be projected is stereoscopic video image information based on which right-eye video images and left-eye video images are switched and alternately outputted at the switching timings,
wherein the controller carries out the first control process when the judgment made by the video image information judging unit shows that the video image information is the stereoscopic video image information.

3. The projector according to claim 2,
wherein when the judgment made by the video image information judging unit shows that the video image information is not the stereoscopic video image information, the controller carries out a second control process in which the discharge lamp driver is controlled to supply an AC current as the drive current to the discharge lamp,
the second control process includes a second electric power control process in which second average drive electric power is determined based on the drive voltage detected by the voltage detector and the discharge lamp driver is controlled to supply the drive current to the discharge lamp in such a way that the average drive electric power is set at the second average drive electric power, and
the first average drive electric power and the second average drive electric power are determined by using different references in the first electric power control process and the second electric power control process.

4. The projector according to claim 3,
wherein the controller determines the first average drive electric power and the second average drive electric power in such a way that the first average drive electric power is higher than or equal to the second average drive electric power.

5. The projector according to claim 1,
wherein when the drive voltage detected by the voltage detector has a large value, at least one of the first average drive electric power and the second average drive electric power has a large value.

* * * * *